United States Patent

Pustka et al.

[11] 4,088,405
[45] May 9, 1978

[54] APPARATUS FOR MOVING COMPONENT PARTS IN PHOTOGRAPHIC COPYING MACHINES OR THE LIKE

[75] Inventors: Karel Pustka; Gabriel Vondrovsky, both of Munich, Germany

[73] Assignee: Agfa-Gevaert Aktiengesellschaft, Leverkusen, Germany

[21] Appl. No.: 705,817

[22] Filed: Jul. 16, 1976

[30] Foreign Application Priority Data

Jul. 21, 1975 Germany .............................. 2532563

[51] Int. Cl.² ..................... G03B 27/76; G03B 9/08
[52] U.S. Cl. ........................................ 355/71; 354/234
[58] Field of Search .................. 355/71, 34, 32, 36, 355/101; 354/234, 235, 226, 266; 352/169

[56] References Cited

U.S. PATENT DOCUMENTS

| | | | |
|---|---|---|---|
| 3,635,141 | 1/1972 | Starp et al. | 354/235 |
| 4,001,844 | 1/1977 | McClintock | 354/235 |

FOREIGN PATENT DOCUMENTS

| | | | |
|---|---|---|---|
| 2,403,315 | 8/1975 | Germany | 355/71 |
| 603,961 | 6/1948 | United Kingdom | 354/234 |

Primary Examiner—L. T. Hix
Assistant Examiner—W. J. Brady
Attorney, Agent, or Firm—Peter K. Kontler

[57] ABSTRACT

Apparatus for pivoting a shutter or a filter between two end positions in a photographic copying machine has two magnetic systems one of which moves the shutter or filter during the last stage of movement from one to the other end position and thereupon holds the shutter or filter in the selected end position. The other magnetic system initiates the movement of shutter or filter from the one to the other end position and accelerates it during movement to a neutral position midway between the two end positions. The other system is deactivated while the shutter or filter moves between the neutral and other end positions. Each system can include an electromagnet. Alternatively, the other system employs two electromagnets and the one system then uses a permanent magnet which shares the movements of the shutter or filter.

28 Claims, 4 Drawing Figures

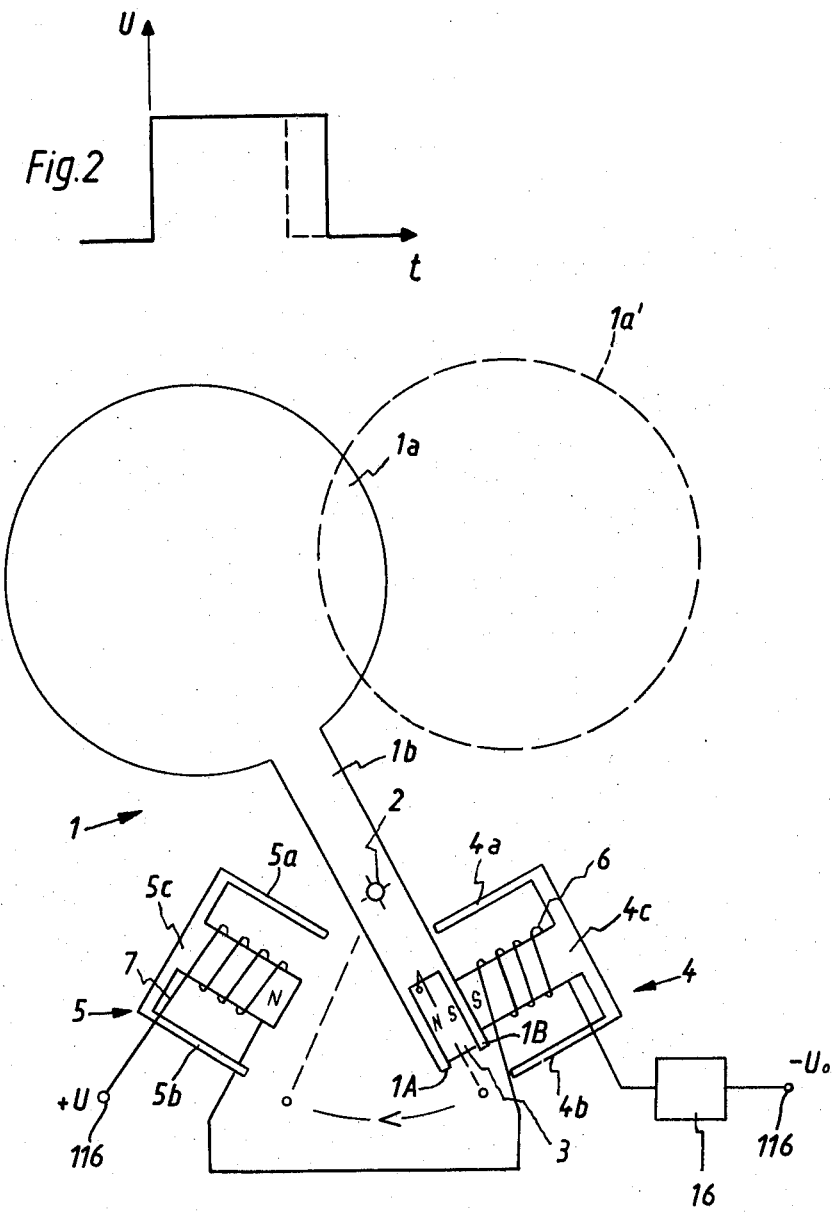

APPARATUS FOR MOVING COMPONENT PARTS IN PHOTOGRAPHIC COPYING MACHINES OR THE LIKE

BACKGROUND OF THE INVENTION

This invention relates to apparatus for moving shutter blades, filter elements or other components of photograhic copying machines or the like between spaced-apart first and second end positions and for holding such components in selected end positions. More particularly, the invention relates to improvements in apparatus wherein a mechanical component (such as a shutter blade or a filter element) is movable between and can be held in either of two end positions by magnetic force.

It is already known to resort to magnetic fields in order to move filter elements and/or shutter blades of copying machines between first and second end positions. If the mobile component is a shutter blade, it allows light to pass through the shutter in one end position and prevents the passage of light in the other end position thereof. A filter element extends across the path of copying light in one end position and is remote from such path in the other end position. In many instances, the component is movable by means of a rotary electromagnet which continuously accelerates the component during movement from the one to the other end position (because the width of the magnetic gap decreases); the component is brought to an abrupt halt by a fixed stop against which the component abuts in the other end position. Such apparatus are not entirely satisfactory because the impingement of mobile component against the stop generates noise and the component is likely to rebound on the stop which can result in undesirable secondary exposure to light if the mobile component is a shutter blade.

It was further proposed to move filter elements or shutter blades by means of linear motors. The current in the moving coils of the linear motor must be regulated with a high degree of accuracy, and this can be achieved only by resorting to extremely complex, bulky, expensive and highly sensitive control circuits. Such circuits must insure that the filter element or shutter blade is accelerated during the first half and is gradually decelerated during the second half of movement from the one toward the other end position. Therefore, such linear motors failed to gain widespread acceptance in the art of copying machines in spite of the fact that they can insure rapid and controlled movements of filter elements or other mobile components between two spaced-apart end positions.

OBJECT AND SUMMARY OF THE INVENTION

An object of the invention is to provide a simple, compact and inexpensive apparatus which can effect movements of mechanical components between spaced-apart first and second end positions with a high degree of reproducibility and within sufficiently short intervals of time.

Another object of the invention is to provide an apparatus wherein a shutter blade, a filter element or another mobile component can be moved to and immediately retained in a selected end position without appreciable generation of noise and by resorting to simple and inexpensive electric circuitry.

A further object of the invention is to provide the apparatus with novel and improved means for holding the mobile component in either end position and with novel and improved means for moving the mobile component between its end positions.

An additional object of the invention is to provide an apparatus which can be installed in existing copying machines or the like as a superior substitute for presently known apparatus which are used to move shutter blades, filter elements or analogous mechanical components between spaced-apart first and second end positions.

Still another object of the invention is to provide an apparatus which is especially suited to effect and control movements of pivotable shutter blades or filter elements in photographic copying machines.

The invention is embodied in an apparatus for moving a shutter blade, a filter or an analogous component of a photographic copying machine or the like between spaced-apart first and second end positions by magnetic force. The apparatus comprises a shaft or analogous guide means in or on which the component is freely movable between its end positions, a first magnetic system having means (e.g., portions of the soft iron cores of two discrete electromagnets) for attracting the component to either end position and for holding the component in the selected end position, a second magnetic system including electromagnet means (e.g., the aforementioned discrete electromagnets) which is energizable to initiate the movement of the component from either end position toward the other end position and to thereby accelerate the component, and control means for deenergizing the electromagnet means before the component reaches the other end position whereupon the first magnetic system completes the movement of the component to and then holds the component in the other end position. The guide means can define an axis for pivotal movement of the component between its end positions.

In accordance with a first embodiment of the invention, the first magnetic system comprises discrete first and second stop means against which the component respectively abuts in the first and second end positions; the first system then further comprises a permanent magnet which shares the movements of the component.

In accordance with a second embodiment of the invention, each magnetic system comprises an electromagnet. One electromagnet is deenergized when the other electromagnet is energized, and vice versa. In the second embodiment, a single stop can be used to arrest the movable component in either end position.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic elevational view of an apparatus which embodies one form of the invention and wherein the first magnetic system includes a permanent magnet which shares the movements of a pivotable component;

FIG. 2 is a diagram showing the manner in which the flow of current in the coils of electromagnets in the first apparatus is regulated as a function of time;

DESCRIPTION OF THE PREFERRED EMBODIMENTS

Figure 3:
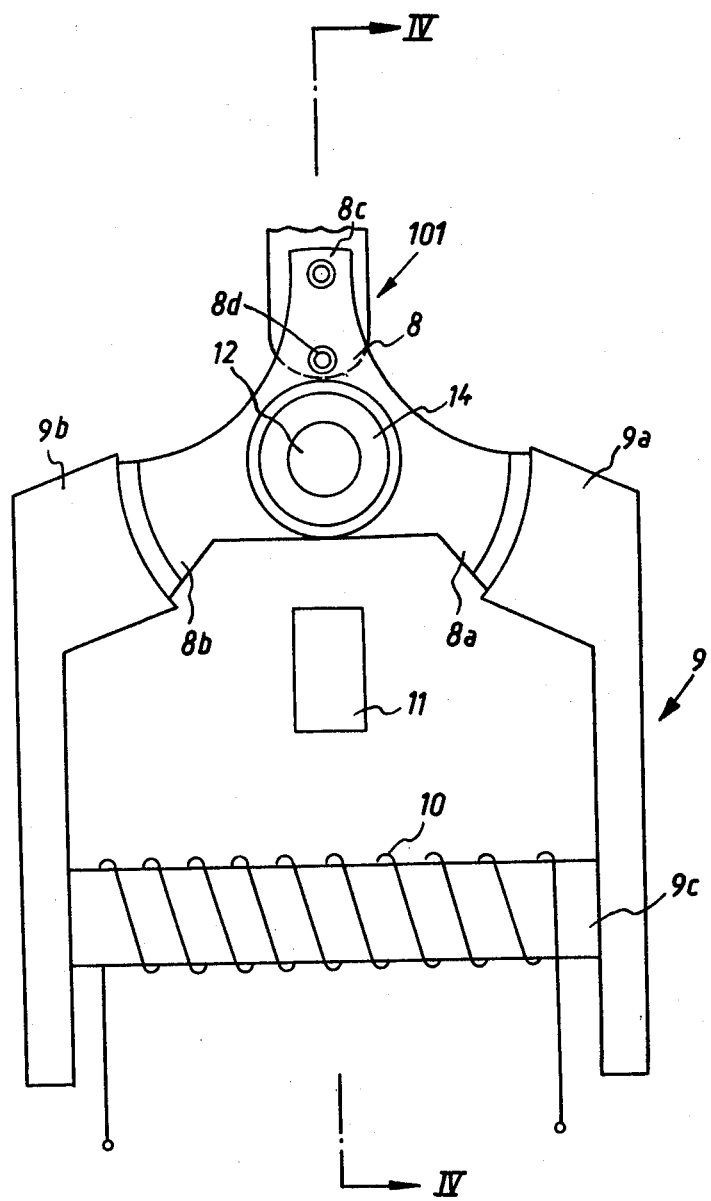
FIG. 3 is a schematic elevational view of a second apparatus.

Referring first to FIG. 1, there is shown an apparatus wherein a fixed shaft 2 or analogous combined supporting and guide means defines a pivot axis for a mobile component 1 which is assumed to constitute a shutter blade. The arm or shank 1b which carries a disk-shaped light-intercepting portion 1a of the blade 1 rotates on suitable antifriction bearings (e.g., roller bearings or ball bearings, not shown) so that the movements of the shank 1b between the illustrated first end position and a second end position (in which the disk 1a assumes the broken-line position 1a') are practically unobstructed. The disk 1a may consist of thin sheet metal and the shank 1b preferably consists of insulating material, e.g., a suitable synthetic plastic substance. The shank 1b carries a permanent magnet 3 which is spaced apart from the shaft 2 and is located opposite the disk 1a. The permanent magnet 3 exhibits high remanence and a high coercive force, i.e., the product of remanence and coercive force is high. Materials which can be used in the manufacture of permanent magnet 3 include rare earth metals, such as samarium, cobalt alloys or cerium alloys. The permanent magnet 3 is magnetized in a manner as shown in FIG. 1, i.e., when the blade 1 is to leave its first position, the north pole of the magnet 3 faces a north pole and the south pole of the magnet 3 faces a south pole. The two poles of the magnet 3 are coated with layers 1A, 1B of damping material; such layers may constitute relatively thin plates or films of the material of the synthetic plastic shank 1b.

The shank 1b abuts against a stop 4c which constitutes the central portion of an E-shaped soft iron core of an electromagnet 4. The outer portions 4a, 4b of this core are remote from the central portion 4c and hence also from the permanent magnet 3. A second electromagnet 5 has a similar E-shaped core with a central portion 5c and two outer portions 5a, 5b; the central portion 5c constitutes a stop against which the shank 1b abuts in the second end position of the shutter blade 1. If desired, the E-shaped cores of the electromagnets 4 and 5 can be replaced with mushroom-shaped cores. In either event, the cross-sectional areas of the central portions 4c, 5c preferably equal or closely approximate the cross-sectional area of the permanent magnet 3. This insures that each of the parts 3, 4c produces half the holding force in the first end position of the shutter blade 1, and that each of the parts 3, 5c furnishes half the holding force which is needed to retain the shutter blade in the second end position.

The exciting coils 6, 7 of the electromagnetic 4, 5 are connected to each other in parallel or in series, and are further connected to a common current source 116 by means of a control circuit 16 which determines the length of interval during which the coils are excited while the blade 1 moves from the first end position toward the second end position, or vice versa.

The operation:

When the blade 1 is to dwell in the first end position of FIG. 1, the coils 6 and 7 of the electromagnets 4, 5 are disconnected from the current source 116. Since the stray field of the permanent magnet 3 is relatively strong, the magnet 3 adheres to the central portion 4c of the core of electromagnet 4 with a substantial force, i.e., the first position of the blade 1 is a stable position in which the shutter blade normally remains due to attraction between the permanent magnet 3 and core of the electromagnet 4.

If the shutter blade 1 is to be moved to the second end position (in which the disk 1a assumes the broken-line position 1a'), the control circuit 16 completes the circuit of the coils 6, 7 and current source 116. The direction of current flow is selected in such a way that a south pole is induced in the central portion 4c opposite the south pole of the permanent magnet 3. Owing to the highly inhomogeneous stray field between the outer portions 4a, 4b of the core of electromagnet 4, the latter produces a strong repelling force which acts on the permanent magnet 3 and causes rapid acceleration of the shank 1b in a clockwise direction, as viewed in FIG. 1. The repelling force (and hence the acceleration of shutter blade 1) decreases proportionally with increasing width of the gap between the central portion 4c and the permanent magnet 3.

The coil 7 induces a north pole at that end of the central portion 5c of the core of electromagnet 5 which faces the north pole of the permanent magnet 3. Thus, when the shank 1b assumes its neutral position (exactly midway between the central portions 4c and 5c), the repelling force of the electromagnet 4 matches the repelling force of the electromagnet 5. Consequently, and if the electromagnets 4, 5 remain energized, the acceleration of shutter blade 1 is terminated in the neutral position of shank 1b but the blade continues to move toward the second end position at a maximum speed. However, as the shank 1b moves beyond the neutral position, the braking or repelling force of the electromagnet 5 increases proportionally with decreasing width of the gap between the permanent magnet 3 and central portion 5c, and such braking force causes the shutter blade 1 to come to a full stop before the shank 1b reaches and abuts against the central portion or stop 5c. Thus, in the absence of any regulation of the current, the shutter blade 1 will change the direction of its movement before it reaches the second end position and begins to move back toward the first end position. In other words, the blade 1 oscillates back and forth at a decreasing amplitude, and finally comes to a halt in the neutral position of the shank 1b. The decreasing amplitude is attributable to friction between the shank 1b and the bearing or bearings which surround the shaft 2 as well as to friction between such bearings and the shaft.

In order to prevent stoppage of the blade 1 in neutral position of the shank 1b, the control circuit 16 (which may include a photoelectric cell serving to monitor the angular position of the shutter blade 1, or a timer) can disconnect the coils 6, 7 from the source 116 before the braking force upon the permanent magnet 3 reaches a value which suffices to cause the shutter blade to reverse the direction of its movement without reaching the second end position. The circuit 16 can disconnect the coils 6, 7 from the source 116 at any time after the shank 1b moves beyond the neutral position. Such disconnection results in deenergization of electromagnets 4, 5 so that the braking action of the electromagnet 5 disappears, i.e., the permanent magnet 3 is attracted to the central portion 5c (which is nearer thereto than the central portion 4c) and comes to a halt as soon as it abuts against the portion 5c. The latter then attracts the shank 1b so that the shutter blade 1 remains in the second end position as long as the electromagnets 4, 5 remain deenergized. If the circuit 16 disconnects the coils 6, 7 from the source 116 before the shank 1b reaches the neutral position, the permanent magnet 3 is attracted to the core of the electromagnet 4 because the central portion 4c of this core is nearer to the permanent magnet than the central portion 5c. Thus, the shank 1b is braked during further movement of the blade 1 toward the second end position and is subjected to the accelerating action of the central portion 5c as soon as it moves beyond the neutral position.

The length of the interval which is needed to move the blade 1 from the first to the second end position is reduced to a minimum if the circuit 16 disconnects the source 116 from the coils 6, 7 at the exact moment when the shank 1b reaches the neutral position. This will be readily understood because the blade 1 moves at a maximum speed when the shank 1b reaches the neutral position; if the electromagnets 4, 5 are deenergized at the exact moment when the shank 1b assumes the neutral position, the central portion 5c begins to attract the permanent magnet 3 and the blade 1 undergoes further acceleration during the entire second stage of its movement toward the second end position. However, such timing of deenergization of electromagnets 4, 5 would cause the shank 1b to strike against the central portion 5c with a considerable force even though the rebounding of shank 1b would be negligible due to strong attraction between the parts 3 and 5c.

It has been found that the transport of shutter blade 1 from the first to the second end position is much more satisfactory (without undue acceleration during that stage of movement which follows disconnection of the current source 116 from the coils 6, 7) if the disconnection takes place shortly before or when the shutter blade 1 comes to a full stop, with the shank 1b adjacent to but still spaced from the central portion 5c. Such mode of operation insures that the blade 1 is accelerated (due to attraction between the permanent magnet 3 and central portion 5c) only during the very short-lasting interval of movement in the last portion of the path between the first and second end positions. Such regulation of disconnection of the coils 6, 7 from current source 116 can be achieved in a very simple and inexpensive way, irrespective of whether the control circuit 16 includes a photoelectric cell which monitors the position of the shank 1b or a bistable circuit, such as a flip-flop.

The diagram of FIG. 2 shows by solid lines that the coils 6, 7 are disconnected from the source 116 when the speed of the blade 1 is reduced to zero, i.e., when the blade would change the direction of its movement if the electromagnets 4 and 5 were to remain energized. If the interval which elapses during movement of the shutter blade 1 from the one to the other end position is to be shortened, the circuit 16 disconnects the coils 6, 7 from the source 116 before the shutter blade comes to a full stop; this is indicated in FIG. 2 by a broken line.

If the blade 1 is to move back to the first end position, the circuit 16 again connect the coils 6, 7 with the source 116 whereby the electromagnet 5 repels the permanent magnet 3 and the shank 1b is caused to pivot anticlockwise, as viewed in FIG. 1. The control circuit 16 is thereupon actuated to disconnect the coils 6, 7 from the source 116 at the exact moment when the blade 1 comes to a full stop (i.e., when the shank 1b is adjacent to but still spaced apart from the central portion 4c) or shortly before the shutter blade ceases to pivot anticlockwise.

The elements 3, 4c, 5c can be said to constitute a first magnetic system which serves to hold the shutter blade 1 in the first or second end position as well as to effect the last stage of movement of the shutter blade to either end position. The elements 4, 5 constitute a second magnetic system having one or more electromagnets (with coils 6, 7) which are energizable by the control circuit 16 to effect acceleration of the blade 1 from the one to the other end position during a first stage of movement of the blade to the other end position. When the control circuit 16 denergizes the electromagnets 4, 5, the first magnetic system takes over to transfer the blade 1 to the other end position and to thereupon hold the blade in the other end position.

Figure 4:
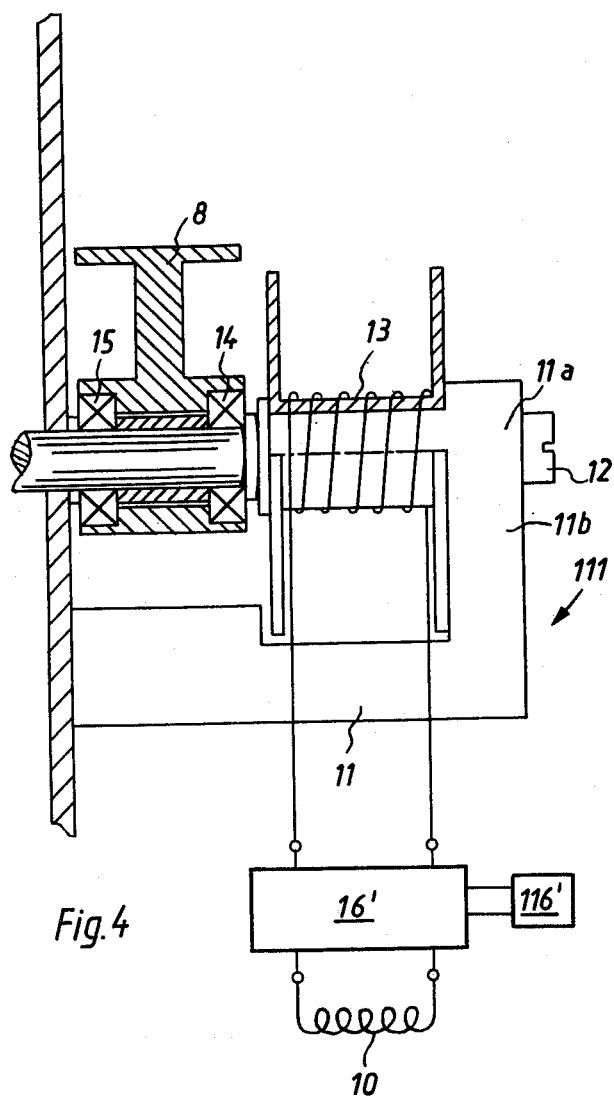
FIG. 4 is a sectional view as seen in the direction of arrows from the line IV—IV of FIG. 3.

FIGS. 3 and 4 illustrate a second apparatus which does not employ a permanent magnet and does not resort to repulsion of the movable component. The apparatus comprises a turnable soft iron armature 8 with two projections or arms 8a, 8b which, not unlike the poles of an electric motor, are provided with relatively large surfaces adjacent to the yokes 9a, 9b of a U-shaped soft iron core forming part of a first electromagnet 9. The connecting portion 9c between the yokes 9a, 9b carries an exciting coil 10. Each of the arms 8a, 8b can move into abutment with a single stop 11 whereby the mobile component 101 (which is connected to a further projection or arm 8c of the armature 8) assumes a first end position when the stop 11 is engaged by the arm 8a and a second end position when the stop 11 is engaged by the arm 8b.

The stop 11 forms part of a second electromagnet 111 and constitutes one leg of an L-shaped element the other leg 11b of which has a bore 11a for a soft iron rod or shaft 12. The coil 13 of the second electromagnet 111 is convoluted around the shaft 12. The shaft 12 further supports two antifriction bearings 14, 15 for the armature 8. The magnetic circuit can be completed by way of the stop 11, rod 12 and that arm (8a or 8b) which abuts against the stop 11. The air gap in the region of the bearings 14, 15 is held to a minimum.

The coils 10 and 13 can be connected, one at a time, to a source 116' of D-C current by way of a control unit 16' including an electric switch.

The arm 8c has tapped bores 8d for screws, bolts or analogous fasteners which secure the mobile component 101 (e.g., a shutter blade or a filter element) to the armature 8.

The operation of the second apparatus is as follows:

The armature 8 assumes the neutral position of FIG. 3 and the electromagnet 9 is energized because the aforementioned switch of the control unit 16' is assumed to connect the coil 10 to the source 116' of DC-current. The armature 8 tends to assume that (neutral) position in which the magnetic circuit including the electromagnet 9 encounters a minimal resistance. Therefore, the armature simply remains in the position of FIG. 3. If the electromagnet 9 is deenergized and the switch of the control device 16' connects the source 116' with the coil 13 of the electromagnet 111, the armature 8 is in a position of equilibrium because the attracting force of the stop 11 upon the arm 8a equals or very closely approximates the attracting force upon the arm 8b. The state of equilibrium is unstable and, as a rule, does not exist at all so that the arm 8a or the arm 8b begins to move toward the stop 11 and the armature 8 assumes one of its end positions when the arm 8a or 8b moves into actual abutment with the stop 11. If the position of the switch in the control unit 16' is thereupon changed to energize the electromagnet 9, the attracting force for the arm 8a or 8b (assumed to be the arm 8a) disappears and, since the armature 8 is remote from that angular position in which the magnetic field encounters a minimal resistance, the armature seeks to assume such position under the influence of magnetic flux and moves the arm 8a away from the stop 11. The armature 8 undergoes acceleration on its way toward such position and reaches a maximum speed in the neutral position of FIG. 3. Owing to inertia, the armature 8 is caused to turn beyond such neutral position and, in the absence of any regulation of energization of electromagnets 9 and 111, the armature simply oscillates back and forth to both sides of the neutral position of FIG. 3 while the amplitude of its oscillations decreases until the armature comes to a full stop in the neutral position. However, if the electromagnet 111 is energized after the armature 8 moves beyond the neutral position, the stop 11 begins to attract the arm 8b and causes the armature and the component 101 to move to the other end position. The speed of the armature 8 increases while the arm 8b travels toward engagement with the stop 11. The arm 8b may rebound once or more than once but will rapidly come to rest in the second end position of the armature because it is continuously attracted by the stop 11.

By appropriate timing of the switchover from energization of electromagnet 9 to energization of electromagnet 111 or vise versa, (such timing can be effected by resorting to a control unit which is analogous to the control circuit 16 of FIG. 1, i.e., the control unit 16' may comprise a photoelectric cell which scans the position of the arm 8c or a bistable timer element), the interval which is required for movement of the component 101 from the one to the other end position is longer than the interval of minimum duration; however, the impact of the arm 8a or 8b can be reduced considerably. When the component 101 is to be moved back to the other end position, the other electromagnet is energized whereby the armature 8 moves the arm 8a toward and into abutment with the stop 11. Thus, all that is necessary to set the component 101 in motion is to energize that electromagnet which was deenergized during the dwell of component 101 in one of the two end positions.

The apparatus of FIGS. 3 and 4 exhibits the advantage that the movements of component 101 between its end positions can be regulated in a simpler way because this apparatus does not necessitate the use of a permanent magnet. However, the energy consumption of the second apparatus is higher because one of the electromagnets 9, 111 must remain energized when the component 101 is to be held in the one or the other end position. This is not necessary in the apparatus of FIG. 1 because the permanent magnet 3 is always attracted by one of the stops 4c, 5c.

In the apparatus of FIGS. 3 and 4, the first magnetic system includes the elements 11, 12, 13, 8a and 8b. The second magnetic system includes the armature 8 and the electromagnet 9. The first magnetic system again effects the last stage of movement of the component 101 to selected end position and thereupon holds the component in such end position. The second magnetic system initiates the movement of component 101 from the one or the other end position and accelerates the component during a first stage of movement as long as the electromagnet of the second magnetic system remains energized. When the energization is terminated by the control circuit, the first magnetic system takes over to complete the movement of component 101 to the other end position and to thereupon hold the component in such end position.

The magnetic flux which develops on energization of electromagnet 9 is located in a plane substantially normal to the plane of magnetic flux which develops on energization of the electromagnet 111.

In order to positively prevent that the armature 8 remains in a state of unstable equilibrium (neutral position of FIG. 3), e.g., due to pronounced friction between the armature 8 and the shaft 12 or for another reason, the median positions of the two magnetic systems can be slightly shifted relative to each other so that, when the switch of the control unit 16' is actuated to energize the electromagnet 9 while deenergizing the electromagnet 111 or vice versa, the component 101 invariably moves to the corresponding end position. When the armature 8 holds the component 101 in the selected end position, the movement of component 101 to the other end position can be effected in the aforedescribed manner.

The improved apparatus are susceptible of many further modifications without departing from the spirit of the invention. For example, the apparatus may comprise suitable guide means for a component which is reciprocable (rather then pivotable) between first and second end positions. Thus, the guide means may include a device which can confine a carriage or a like component to reciprocatory movement with a minimum of friction.

It will be noted that in each embodiment of the improved apparatus, one of the two magnetic systems serves to attract the component and to then hold the component in the selected end position, whereas the other magnetic system serves to initiate the movement of such component from the one to the other end position. As mentioned above, activation of the one system, simultaneously with deactivation of the other system, can be effected by resorting to a control unit which includes means for monitoring the position of the mobile component (or of a support or carrier for such component), or which is simply designed to deactivate one of the systems and to simultaneously activate the other system with a preselected delay following the start of movement of mobile component from its previous end position toward the other end position.

The control circuit may correspond to the circuit of FIG. 1 of U.S. Pat. No. 3,426,357 issued Feb. 4, 1969.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. Apparatus for moving a shutter blade, a filter or an analogous component of a photographic copying machine or the like between spaced-apart first and second end positions by magnetic force, comprising guide means in or on which said component is freely movable between said end positions; a first magnetic system having means for attracting said component to either of said end positions and for holding said component in the selected end position; a second magnetic system including electromagnet means energizable to initiate the movement of said component from either one of said end positions toward the other end position and to thereby accelerate said component, said attracting and holding means of said first magnetic system being arranged to repel said component during movement of said component from said one end position beyond a neutral position disposed intermediate said end positions; and control means for deenergizing said electromagnet means while said component occupies said neutral position or is located between said neutral and other end positions whereupon said first system completes the movement of said component to and thereupon holds said component in the other end position.

2. Apparatus as defined in claim 1, wherein said guide means defines an axis for pivotal movement of said component between said end positions.

3. Apparatus as defined in claim 1, wherein said first magnetic system includes first and second stop means against which said component respectively abuts in said first and second end positions thereof.

4. Apparatus as defined in claim 3, wherein said first magnetic system further includes a permanent magnet and each of said stop means consists of soft iron.

5. Apparatus as defined in claim 4, wherein said permanent magnet has high remanence and high coercive force, said permanent magnet and the respective stop means each producing one-half of the holding force in the respective end position of said component.

6. Apparatus as defined in claim 4, wherein said permanent magnet shares the movements of said component and one of its poles abuts against the respective stop means in each of said end positions thereof, said stop means being stationary.

7. Apparatus as defined in claim 6, further comprising layers of damping material coating the poles of said permanent magnet.

8. Apparatus as defined in claim 7, wherein said material is a synthetic plastic substance.

9. Apparatus as defined in claim 6, wherein each of said stop means forms part of a discrete electromagnet and constitutes at least a portion of the core of the respective electromagnet.

10. Apparatus as defined in claim 9, wherein each of said cores is E-shaped and includes a central portion and two outer portions, said central portions being immediately adjacent to said permanent magnet in the respective end positions of said component.

11. Apparatus as defined in claim 10, wherein the cross-sectional area of each of said central portions equals or closely approximates the cross-sectional area of said permanent magnet.

12. Apparatus as defined in claim 9, wherein said electromagnets constitute said electromagnet means of said second magnetic system and are energizable to induce in said stop means poles which are identical with the adjacent poles of said permanent magnet so that the stop means against which said permanent magnet abuts in a given end position of said component repels the component from such end position.

13. Apparatus as defined in claim 12, wherein each of said stop means constitutes a first portion of the core of the respective electromagnet and each of said cores further comprises two additional portions which are remote from the respective first portion.

14. Apparatus as defined in claim 9, wherein said electromagnets further include coils which are connected in series with each other and with said control means.

15. Apparatus for moving a shutter blade, a filter or an analogous component of a photographic copying machine or the like between spaced-apart first and second end positions by magnetic force, comprising guide means in or on which said component is freely movable between said end positions; a first magnetic system having means for attracting said component to either of said end positions and for holding said component in the selected end position, said first system including a permanent magnet which shares the movements of said component and first and second stationary stop means, one pole of said permanent magnet abutting against the respective stop means in each end position of said component, said stop means consisting of soft iron and each thereof forming part of a discrete electromagnet and constituting at least a portion of the core of the respective electromagnet, said electromagnets further including coils which are connected in series with each other; a second magnetic system including electromagnet means energizable to initiate the movement of said component from either one of said end positions toward the other end position and to thereby accelerate said component; and control means for deenergizing said electromagnets after said component moves beyond a neutral position substantially midway between said end positions thereof and before said component reaches the other end position whereupon said first system completes the movement of said component to and thereupon holds said component in the other end position, said control means being connected in series with said coils and said electromagnets constituting the electromagnet means of said second system and each of said stops tending to repel said permanent magnet during movement of said component from one to the other end positions thereof under the action of said second system whereby, in the absence of deenergization of said electromagnets by said control means, said component comes to a halt short of said other end position, said deenergizing means of said control means being arranged to deenergize said electromagnets when said component comes to a halt or while the component moves beyond said neutral position toward the position in which said component would come to a halt.

16. Apparatus as defined in claim 15, wherein said deenergizing means comprises a timer.

17. Apparatus as defined in claim 15, wherein said deenergizing means comprises means for monitoring the position of said component intermediate said end positions thereof.

18. Apparatus for moving a shutter blade, a filter or an analogous component of a photographic copying machine or the like between spaced-apart first and second end positions by magnetic force, comprising guide means in or on which said component is freely movable between said end positions; a first magnetic system having means for attracting said component to either of said end positions and for holding said component in the selected end position; a second magnetic system including first electromagnet means energizable to initiate the movement of said component from either one of said end positions toward the other end position and to thereby accelerate said component, said first magnetic system comprising second electromagnet means and each of said electromagnet means comprising a coil; and control means for deenergizing said electromagnet means before said component reaches the other end position whereupon said first system completes the movement of said component to and thereupon holds said component in the other end position, said control means comprising means for alternately exciting said coils.

19. Apparatus as defined in claim 18, wherein said control means further comprises means for deenergizing the energized electromagnet means and for simultaneously the other electromagnet means in a predetermined position of said component intermediate said end positions thereof.

20. Apparatus as defined in claim 18, wherein said control means further comprises means for deenergizing the energized electromagnet means and for simultaneously energizing the other electromagnet means after elapse of a predetermined interval of time following the start of movement of said component from either one of said end positions toward the other end position thereof.

21. Apparatus as defined in claim 18, further comprising an armature for said component and means defining for said armature a fixed axis about which said component is pivotable between said end positions thereof, said armature having first and second portions which form part of said first magnetic system, said electromagnet means of said second magnetic system having a soft iron core including two yokes each of which is adjacent to one portion of said armature when said component is located in a neutral position substantially midway between said end positions thereof.

22. Apparatus as defined in claim 21, wherein said portions of said armature consist of soft iron.

23. Apparatus as defined in claim 21, wherein said first magnetic system produces a first magnetic flux on energization of said second electromagnet means and said second magnetic system produces a second magnetic flux on energization of the respective electromagnet means, the plane of said first flux being substantially normal to the plane of said second flux.

24. Apparatus as defined in claim 23, wherein said second electromagnet means comprises a coil and said axis defining means comprises a soft iron shaft, said coil being wound on said shaft and said second electromagnet means further comprising a core having a portion which constitutes a stop for said component in either of said end positions.

25. Apparatus as defined in claim 24, wherein one of said portions of said armature abuts against said stop in one end position of said component and the other portion of said armature abuts against said stop in the other end position of said component.

26. Apparatus as defined in claim 18, wherein said magnetic systems are offset with respect to each other so that one thereof acts upon said component when said component is located in a neutral position midway between said end positions thereof.

27. Apparatus as defined in claim 18, wherein said control means comprises means for deenergizing the energized electromagnet means and for simultaneously energizing the deenergized electromagnet means after the component moves beyond a neutral position substantially midway between said first and second end positions thereof.

28. Apparatus as defined in claim 27, wherein said deenergizing means is arranged to deenergize the energized electromagnet means shortly before said component reaches an end position.

* * * * *